United States Patent
Šulc et al.

(10) Patent No.: US 11,648,967 B2
(45) Date of Patent: May 16, 2023

(54) FALL PROTECTION LOCKING SYSTEMS

(71) Applicant: Honeywell International Inc., Morris Plains, NJ (US)

(72) Inventors: David Šulc, Jedovnice (CZ); Michal Řehoř, Brno (CZ)

(73) Assignee: HONEYWELL INTERNATIONAL, INC., Morris Plains, NJ (US)

( * ) Notice: Subject to any disclaimer, the term of this patent is extended or adjusted under 35 U.S.C. 154(b) by 953 days.

(21) Appl. No.: 16/399,471

(22) Filed: Apr. 30, 2019

(65) Prior Publication Data
US 2020/0346671 A1    Nov. 5, 2020

(51) Int. Cl.
*B61H 9/02* (2006.01)
*A62B 35/00* (2006.01)
*F16G 11/10* (2006.01)

(52) U.S. Cl.
CPC ........... *B61H 9/02* (2013.01); *A62B 35/0081* (2013.01); *F16G 11/10* (2013.01); *A62B 35/0093* (2013.01)

(58) Field of Classification Search
CPC .............. A62B 35/005; A62B 35/0081; A62B 35/0093; A63B 29/02; B61H 9/02; E04G 21/3204; E06C 7/186; F16D 63/008; F16G 11/10
USPC ....................................................... 188/65.1
See application file for complete search history.

(56) References Cited

U.S. PATENT DOCUMENTS

| | | | | |
|---|---|---|---|---|
| 5,638,919 | A  * | 6/1997 | Pejout ................... | A62B 35/04 |
| | | | | 182/5 |
| 10,035,028 | B1 * | 7/2018 | Siegel ..................... | A62B 1/06 |
| 10,036,202 | B2 * | 7/2018 | Bornack ................ | A62B 35/04 |
| 2007/0215411 | A1 * | 9/2007 | Petzl ...................... | A62B 1/14 |
| | | | | 182/5 |

(Continued)

FOREIGN PATENT DOCUMENTS

| | | |
|---|---|---|
| EP | 1683551 A1 | 7/2006 |
| EP | 2288417 B1 | 3/2018 |

(Continued)

OTHER PUBLICATIONS

Extended European Search Report for Patent Application No. 20169983.2 dated Sep. 2, 2020, 10 pages.

(Continued)

*Primary Examiner* — Thomas J Williams
*Assistant Examiner* — San M Aung
(74) *Attorney, Agent, or Firm* — Alston & Bird LLP (57) ABSTRACT

A locking system is provided for fall protection. The locking system includes a housing. The housing defines a guide path through which the housing is slideably attached to a guide member. The locking system also includes a braking lever having a braking surface and an attachment end. The braking lever is configured to rotate so as to allow a braking surface to engage the guide member. The locking system further include a locking lever that is rotatably coupled to the braking lever. The locking lever is rotatable such that it rotates from an unlocked position to a locked position. In the unlocked position an activation end of the locking lever is positioned in a first location that is proximate to the attachment end and in the locked position the activation end is positioned in a second position distant to the attachment end.

22 Claims, 5 Drawing Sheets

(56) References Cited

U.S. PATENT DOCUMENTS

| | | | |
|---|---|---|---|
| 2009/0120738 A1* | 5/2009 | Everett | A62B 1/14 188/65.4 |
| 2010/0032239 A1* | 2/2010 | Rinklake | E06C 7/186 188/65.1 |
| 2016/0130875 A1* | 5/2016 | Hwang | A62B 1/14 182/5 |
| 2017/0260762 A1* | 9/2017 | Ostrobrod | E04G 21/3204 |

FOREIGN PATENT DOCUMENTS

| | | |
|---|---|---|
| NL | 2016911 A | 8/2017 |
| WO | 2016/093850 A1 | 6/2016 |

OTHER PUBLICATIONS

Office Action received for European Application No. 20169983.2, dated Jul. 21, 2022, 4 pages.

\* cited by examiner

FALL PROTECTION LOCKING SYSTEMS

TECHNOLOGICAL FIELD

An example embodiment relates generally to fall protection systems and, more particularly, to fall protection locking systems.

BACKGROUND

From recreation to survival devices, fall protection devices are instrumental in preserving the safety of users during traversal of uncertain conditions and heights. In order to operate effectively, protection devices must be able to freely travel along a guide member to allow freedom of movement, while also allowing for quick and effective activation of the braking mechanism Applicant has identified a number of deficiencies and problems associated with current fall protection devices. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a locking system is provided for fall protection. The locking system includes a housing defining a guide path through which the housing is slideably attached to a guide member. The locking system also includes a braking lever having a braking surface and an attachment end. The braking lever is configured to rotate so as to allow a braking surface to engage the guide member. The locking system further includes a locking lever that is rotatably coupled to the braking lever. In an instance in which the braking surface of the braking lever is disengaged with the guide member, the locking lever is rotatable such that it rotates from an unlocked position to a locked position. In the unlocked position an activation end of the locking lever is positioned in a first location that is proximate to the attachment end and in the locked position the activation end is positioned in a second position distant to the attachment end.

In some embodiments, the activation end of the locking lever protrudes outwardly from the housing in both the unlocked position and the locked position. In some embodiments, the locking lever and the braking lever rotate in the same radial direction based on the direction of the locking system. In some embodiments, the braking lever includes a protrusion. In such an embodiment, the locking lever also includes a locking ball connected to a locking lever spring. In such an embodiment, the protrusion is in contact with the locking ball so as to restrict rotation of the locking lever from the unlocked position to the locked position.

In some embodiments, the attachment end of the braking lever comprises an attachment opening configured to attach an attachment mechanism. In some embodiments, the locking system is configured such that in the locking position, the motion of the locking system is restricted in one direction along the guide member. In some embodiments, the arcuate distance between the attachment end of the braking lever and the first location of the activation end of the locking lever is the distance between the average thumb and forefinger. In some embodiments, an angle of rotation of the locking lever relative to the braking lever in the unlocked position to the locked position is from 0 degrees to 30 degrees.

In some embodiments, the braking lever is rotatably coupled to the housing at a first point of rotation between the braking surface and the attachment end and the locking lever is rotatably coupled to the braking lever at a second point of rotation between the first point of rotation and the attachment end. In some embodiments, the locking lever and the braking lever are configured to rotate in the same plane of rotation.

In another example embodiment, a locking system is provided for fall protection. The locking system includes a housing defining a guide path through which the housing is slideably attached to a guide member. The locking system also includes a braking lever having a braking surface and an attachment end. The braking lever is operably attached to the housing at a first point of rotation and is configured to rotate so as to allow a braking surface to engage the guide member. The locking system further includes a locking lever that is rotatably coupled to the braking lever at a second point of rotation between the first point of rotation and the attachment end. In an instance in which the braking surface of the braking lever is disengaged with the guide member, the locking lever is rotatable such that it rotates from an unlocked position to a locked position.

In some embodiments, the unlocked position an end of the locking lever is positioned in a first location that is proximate to the attachment end and in the locked position is positioned in a second position distant to the attachment end. In some embodiments, an activation end of the locking lever protrudes outwardly from the housing in both the unlocked position and the locked position. In some embodiments, the locking lever and the braking lever rotate in the same direction based on the direction of the locking system.

In some embodiments, the braking lever also includes a protrusion and the locking lever also includes a locking ball connected to a locking lever spring. In such an embodiment, the protrusion movably engages with the locking ball to restrict rotation of the locking lever from the unlocked position to the locked position. In some embodiments, the braking lever is attached to the housing and the locking lever is coupled to the braking lever using rivets. In some embodiments, the attachment end of the braking lever includes an attachment opening configured to attach an attachment mechanism. In some embodiments, the locking system is configured such that in the locking position, the motion of the locking system is restricted in one direction along the guide member. In some embodiments, the guide member is a rope.

In some embodiments, the distance between the attachment end of the braking lever and the first location of the activation end of the locking lever is the distance between the average thumb and forefinger. In some embodiments, an angle of rotation of the locking lever relative to the braking lever in the unlocked position to the locked position is from 0 degrees to 30 degrees. In some embodiments, the locking lever and the braking lever are configured to rotate in the same plane of rotation.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various example locking systems to allow for quick and efficient activation of the braking mechanism to permanently stop the motion of the locking system in at least a first direction. In various embodiments, the locking system allows a user to advantageously use one hand to activate the braking mechanism and to lock it in place via a proximate locking lever. To allow for one hand operation, the components that require activation and locking may be in close proximity to one another. For example, the components may protrude from a housing in substantially the same direction, may be placed at a distance of equal to or less than the distance between the average person's thumb and forefinger, a component, such as the locking lever, may be rotatably coupled to the another component, such as the braking lever, the components may rotate in the same plane when locking and unlocking, and/or the like.

Figure 1:
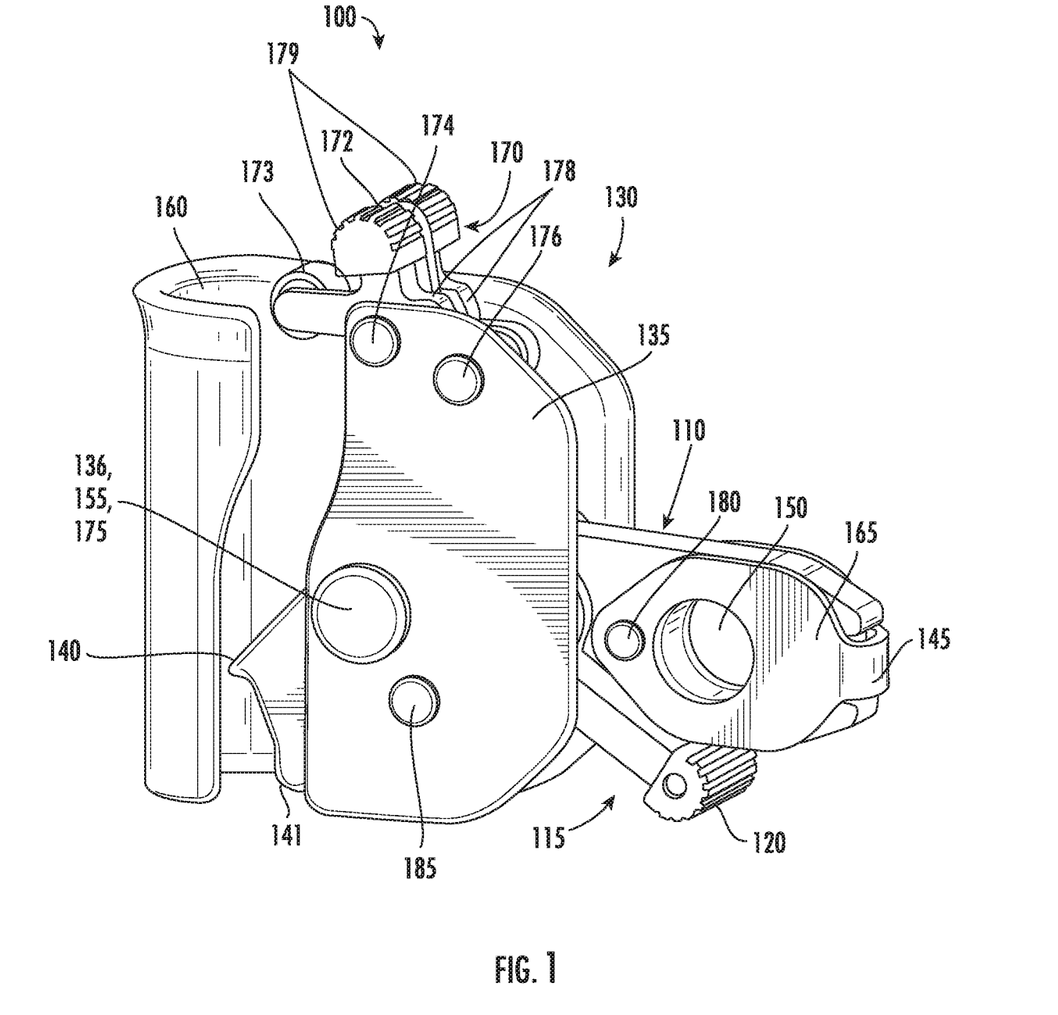
FIG. 1 is an exterior view of an example embodiment of a locking system in accordance with the present disclosure.

Referring now to FIG. 1, an exterior view of the locking system 100 is provided. Locking system 100, in accordance with an example embodiment, is illustrated in the unlocked position. In some examples, the locking system 100 may include a braking lever 110, a locking lever 115, a housing 130, and an engagement member 170.

In some embodiments, the housing 130 may be a unitary piece or have multiple parts, such as shown in FIG. 1. The housing 130 includes an end having a substantially curved portion that defines a guide path 160 that is sized to slideably receive a guide member (not shown), such as a rope, a cable, and/or the like. In some embodiments, the housing 130 includes a cover plate 135 configured to cover at least a portion of the locking system components.

In one example embodiment, the housing defines an aperture 136 that is configured to receive a rivet or pin 155 therethrough so as to operatively couple a locking system 100 to the housing 130. The locking system 100 may include a braking lever 110, which as described herein, is configured to be rotatably attached to the housing by the rivet or pin 155 and rotate about first center of rotation 175, such that a braking surface 140 contacts the a guide member in the guide path 160 so as to arrest its movement in at least one direction. The braking lever 110 may include an attachment end 145 opposite the braking surface 140 that includes an attachment opening 150 to connect a load. The attachment opening 150 may be reinforced by reinforcement material 165 that may be attached to the braking lever 110, such as by an attachment pin or rivet 180. In some embodiments, the braking surface 140 may be a protrusion on the end of the braking lever 110 opposite of the attachment end 145. In some embodiments, the braking lever 110 may have a secondary braking surface 141 on the end of the braking lever 110 opposite the attachment end 145 that is configured to engage with the guide member after the braking surface 140 engages with the guide member. For example, when a user connected to an example locking system 100 falls downward at a fast rate, the braking lever 110 rotates such that both the braking surface 140 and the secondary braking surface 141 engage with the guide member slowing and/or halting the speed of the downward movement (e.g., slowing the speed to zero).

In some embodiments, rivet or pin 185 may be configured to connect the cover plate 135 to the rest of the housing 130. In some embodiments, the rivet or pin 185 may be configured to restrict the range of motion of the braking lever 110. For example, the rivet or pin 185 may be located in a position such that the rivet or pin 185 stops the rotation of the braking lever 110 after the braking surface 140 engages with the guide member, but before any excessive damage is made to the guide member during engagement.

In some examples, the locking system 100 may further include a locking lever 115 operatively coupled to the braking lever 110. In some embodiments, an activation end 120 of the locking lever 115 may protrude outwardly from the locking lever and comprise one or more ridges so as to allow for easy gripping and/or operation. In some examples, the locking lever 115 may be proximate to the attachment end 145 of the braking lever 110, such that the locking system may be operated by a user with one hand. In some embodiments, both the activation end 120 of the locking lever 115 and the attachment end 145 of the braking lever 110 may protrude from the housing 130 in the same or substantially the same direction of the braking lever. Further, and in some examples, the braking lever 110 and the locking lever 115 may be configured to rotate in the same plane.

In some embodiments, the locking system 100 may also include an engagement member 170 configured to engage the guide member at an engagement member wheel 173. In some embodiments, the engagement member 170 may include one or more opening levers 178. In some embodiments, the engagement member 170 may include a divider 172 between one or more opening levers 178. In some embodiments, the opening lever(s) 178 may include an opening lever tab 179 that protrudes from the housing. The engagement member 170 may be attached to the housing by rivets and/or pins 174, 176.

Figure 2A:
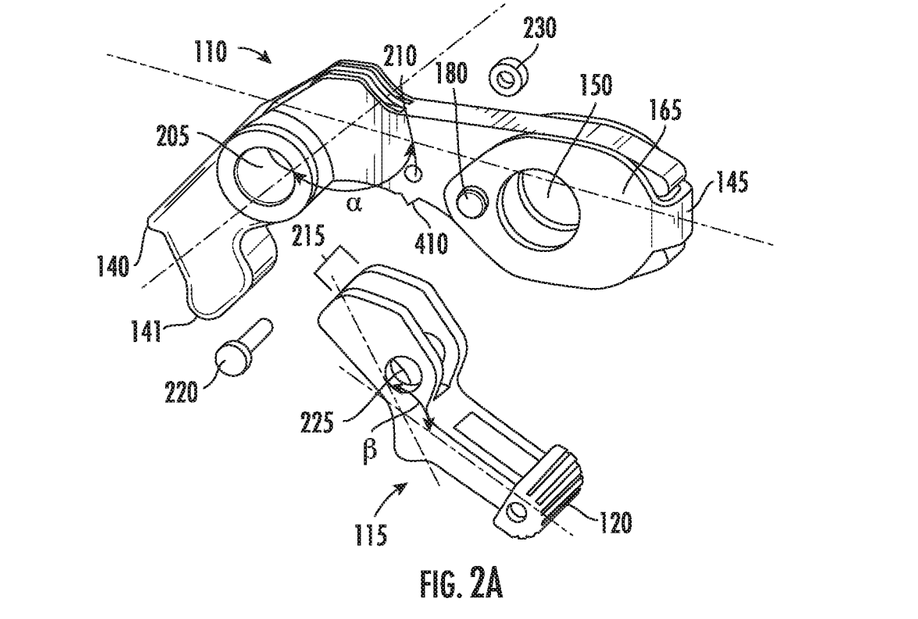
FIG. 2A is an exploded view of the braking lever and the locking lever in accordance with the present disclosure.

Referring now to FIG. 2A, an exploded view of the braking lever 110 and the locking lever 115, in accordance with some example embodiments, is provided. In some embodiments, the braking lever 110 includes a distal end that includes braking surface 140 and secondary braking surface 141 that are positioned proximate to the guide path 160 and an attachment end 145 that is opposite to the distal end. In some embodiments, the braking lever 110 may have a generally angled or bent shape (e.g., angle α).

Figure 4A:
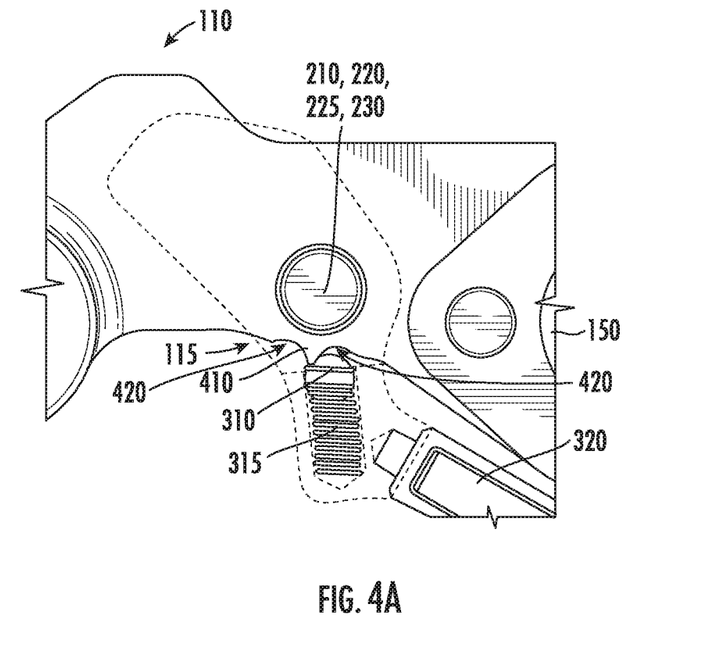
FIG. 4A is a partially transparent view of the interaction between a locking lever and a braking lever in an unlocked position in accordance with an example embodiment of the present disclosure.

The braking lever 110 may define one or more, but preferably three openings. In some examples, these openings include a first rotational opening 205 at or near the proximal end of the braking lever 110, a second rotational opening 210 at or near the center of the braking lever 110, and an attachment opening 150 at or near the attachment end 145. Each of the openings, 150, 205, and 205 define a passage that extends through the braking lever 110. In some embodiments, a protrusion 410 may be provided proximate to the second rotational opening 210 along an edge of the braking lever 110. The protrusion 410, as discussed in FIG. 4, may be configured to engage with the locking lever 115 when the locking lever is operatively coupled with the braking lever 110.

In some embodiments, the braking lever 110 may be operatively attached to the housing 130 at the first rotational opening, such that the braking lever rotates relative to a first center of rotation 175 (e.g., the center of the first rotational opening 205) that is defined by an axis that is perpendicular to the first rotational opening 205. In some embodiments, the first rotational opening 205 may be sized to receive the rivet or pin 155, shown in FIG. 1.

As is described above and in some embodiments, the second rotational opening 210 may be positioned between the first rotational opening 205 and the attachment end 145 of the braking lever 110. In some embodiments, the locking lever 115 may be operatively coupled to the braking lever 110 at the second rotational opening 210, such that the locking lever 115 rotates relative to the second center of rotation (e.g., the center of the second rotational opening 210). In some embodiments, the second rotational opening 210 may be configured to receive the locking lever rivet 220. In some embodiments, the locking lever rivet 220 is configured to engage with the locking lever opening(s) 225 and the second rotational opening 210 and also be engaged with a rivet ring 230.

In some embodiments, the attachment opening 150 may be reinforced, such as by the reinforcement material 165 attached (e.g., via the attachment pin or rivet 180) to the braking lever 110. In some embodiments, the attachment end 145 may be configured to withstand the load attached to the locking system 100. For example, a rope may be attached (e.g., tied or coupled by way of a carabiner) to the attachment opening 150 at one end of the rope and the other end of the rope may be attached to load (e.g., a person) using the locking system 100. In some embodiments, the attachment opening 150 may be reinforced, such as shown in FIG. 2A, wherein reinforcement material 165 is attached to the braking lever 110 by the attachment pin or rivet 180.

In some embodiments, the locking lever 115 may be configured with an activation end 120 and an engaging end 215. In some embodiments, the activation end 120 may have a gripping surface that comprises one or more ridges so to allow a user to interact with the locking lever 115.

In some embodiments, the engaging end 215 may have a plurality of surfaces. For example, as shown in more detail in FIG. 3, the locking lever 115 may have a recess 325 that is defined by two protruding portions of the locking lever 115. In some embodiments, the locking lever 115 may be angled between the activation end 120 and the engaging end 215 (e.g., angle β). In some embodiments, the angle between the activation end 120 and the engaging end 215 may complement the angle of the braking lever 110. For example, the angle of the locking lever 115 may be similar to, or in some examples, the same angle as the braking lever 110, albeit in the opposite direction. In some embodiments, the locking lever 115 may be sufficiently angled so as to allow for one hand operation.

Figure 2B:
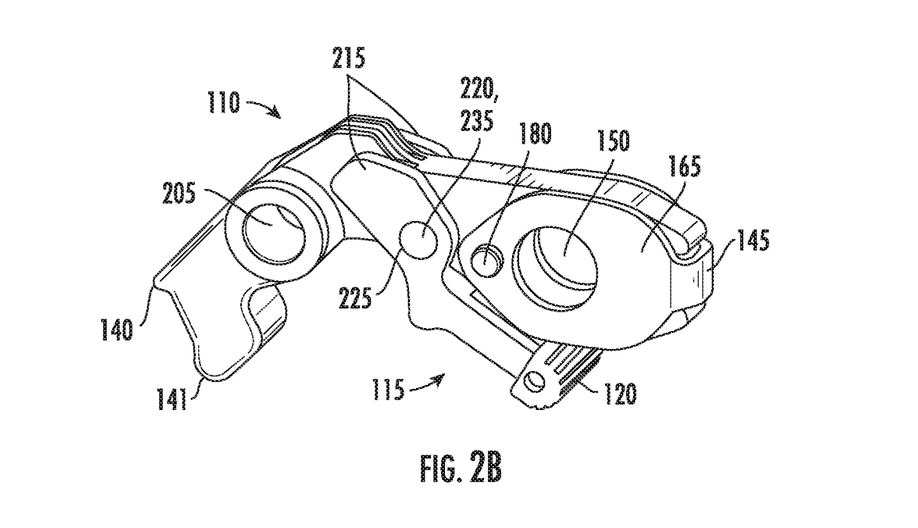
FIG. 2B is an assembled view of the braking lever and the locking lever in accordance with the present disclosure.

Referring now to FIG. 2B, the braking lever 110 and the locking lever 115 are shown operatively coupled together in accordance with an example embodiment. In some embodiments, the locking lever 115 may be operatively coupled to the braking lever 110 about the second center of rotation 235. In some embodiments, an attachment mechanism (e.g., locking lever rivet 220 and rivet ring 230) may rotatably secure the locking lever 115 to the braking lever 110. In an example embodiment, the locking lever rivet 220 may be configured to pass through one or more locking lever openings 225 and the second rotational opening 210, such that the center of the locking lever opening(s) 225, the center of the second rotational opening 210, and the second center of rotation 235 are all the same point. In some embodiments, the engaging end 215 of the locking lever 115 may extend beyond the braking lever 110.

Figure 3:
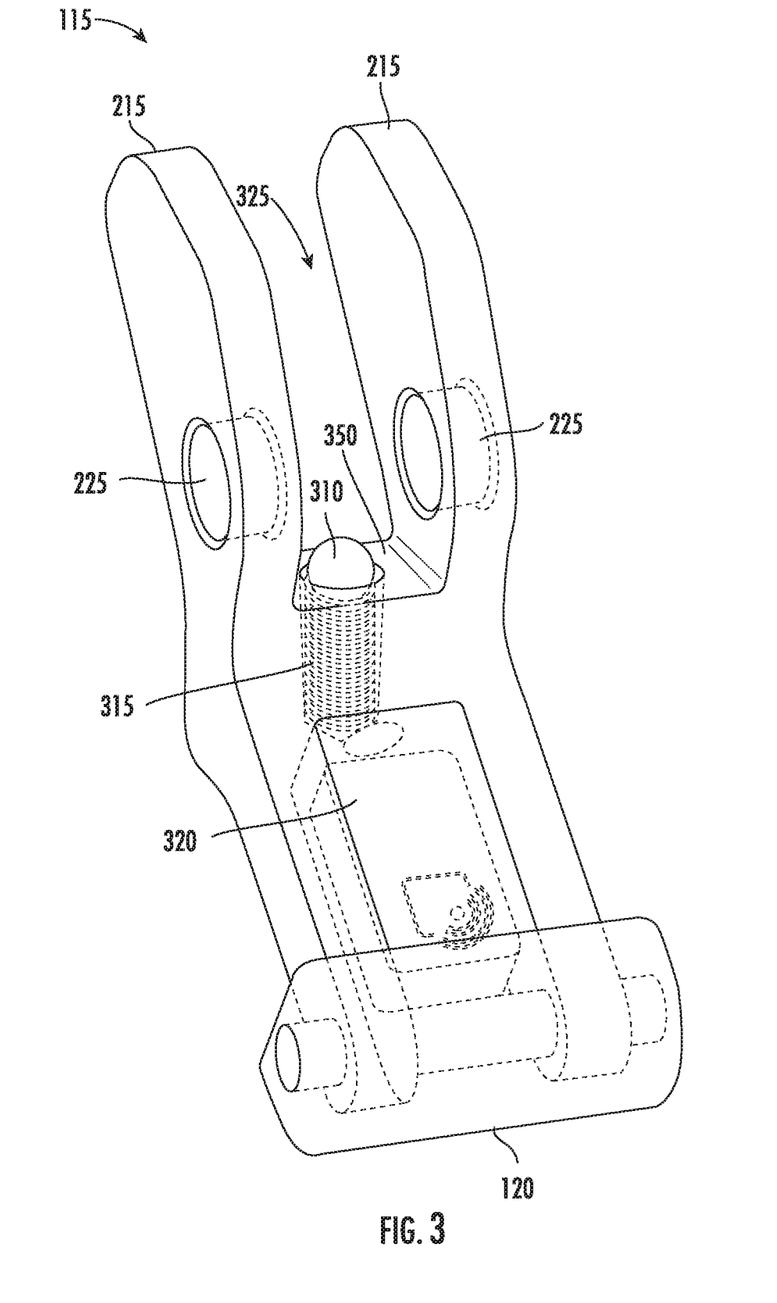
FIG. 3 is a transparent view of a locking lever in accordance with an example embodiment of the present disclosure.

Referring now to FIG. 3, a transparent view of a locking lever in accordance with an example embodiment is provided. In some embodiments, the locking lever may include a recess 325 that is defined by the two engaging ends 215 of the locking lever 115 and a proximal surface 350. In some examples, the proximal surface 350 defines an recess 325 sized to receive a locking ball 310 and locking lever spring 315.

In some embodiments, the locking lever spring 315 may be attached or otherwise coupled to a distal end of the recess 325 at a first end and in communication with the locking ball 310 at the second or opposite end. In some examples, the locking lever spring 315 biases the locking ball 310 outwardly and into the recess such that at least a portion of the locking ball 310 extends outwardly beyond the plane defined by proximal surface 350. In some examples, the locking ball is mounted such that in an instance in which a force is applied to the locking ball 310, the locking ball 310 recedes into the recess 325 until the force is no longer applied. In some embodiments, the locking lever spring 315 characteristics, such as the spring constant and/or length, may be selected based on the desired resistance of the locking ball 310 to movement.

In some embodiments, the locking lever 115 may include a radio-frequency identification (RFID) device. For example, the locking lever 115 may have a compartment configured to receive the RFID device 320. In some examples, the RFID device 320 may send a signal in an instance in which the locking lever 115 is an unlocked or locked position. Alternatively or additionally, the RFID device 320 may send a signal in an instance in which the locking lever 115 rotates from an unlocked position to a locked position or vice versa Referring now to FIG. 4A, the interaction of the braking lever 110 and the locking lever 115 is provided in an instance when the locking lever is in the unlocked position (e.g., the activation end of the locking lever is in a first location proximate to the attachment end 145 of the braking lever 110 such that the braking surface 140 is not engaged with the guide member 510). In an example embodiment, the braking lever 110 may include a protrusion 410 that is sized and shaped to contact the locking ball 310 when the locking lever 115 is operatively attached to the braking lever. In an unlocked position, such as is shown in FIG. 4A, the protrusion 410 may resist movement of the locking lever 115.

In some embodiments, the braking lever 110 may have two locking ball recesses 420 positioned on each side of the protrusion 410 to receive the locking ball, such that the motion of the locking lever 115 is limited. In some examples, the locking ball recesses 420 are shaped so as to receive the locking ball 310 and require a force be applied to the locking lever 115 to urge the locking ball 310 from a resting position and over a tip of the protrusion 410. For example, the protrusion 410 may resist accidental rotation of the locking lever during usage (e.g., the locking lever 115 may only rotate into the locking position when a user applies force to overcome the locking lever spring 315 force sufficiently to allow the locking ball 310 to move from one side of the protrusion 410 to the other).

Figure 4B:
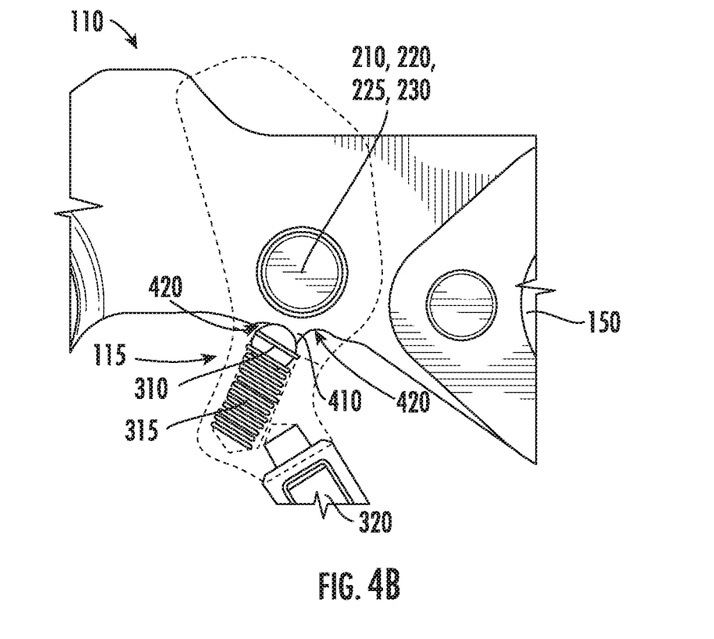
FIG. 4B is a partially transparent view of the interaction between a locking lever and a braking lever in a locked position in accordance with an example embodiment of the present disclosure.

Referring now to FIG. 4B, the interaction of the braking lever 110 and the locking lever 115 is provided in an instance when the locking lever is in the locked position (e.g., the activation end of the locking lever is in a second location distant to the attachment end 145 of the braking lever 110 such that the braking surface 140 is engaged with the guide member 510). In an instance in which the locking lever 115 is activated in response to the application of a force (e.g., the locking lever 115 is moved by the user from the first location to the second location to engage the guide member 510 with the braking surface 140), the locking ball 310 may engage with the protrusion 410, such that the protrusion provides a force opposite to the compression force of the locking lever spring 315 so as to allow the locking ball 310 to depressed (e.g., into the opening receiving the locking lever spring 315). In some examples and in instance in which a sufficient force is applied, the locking lever 115 is able to move from the unlocked position to the locked position.

Figure 5A:
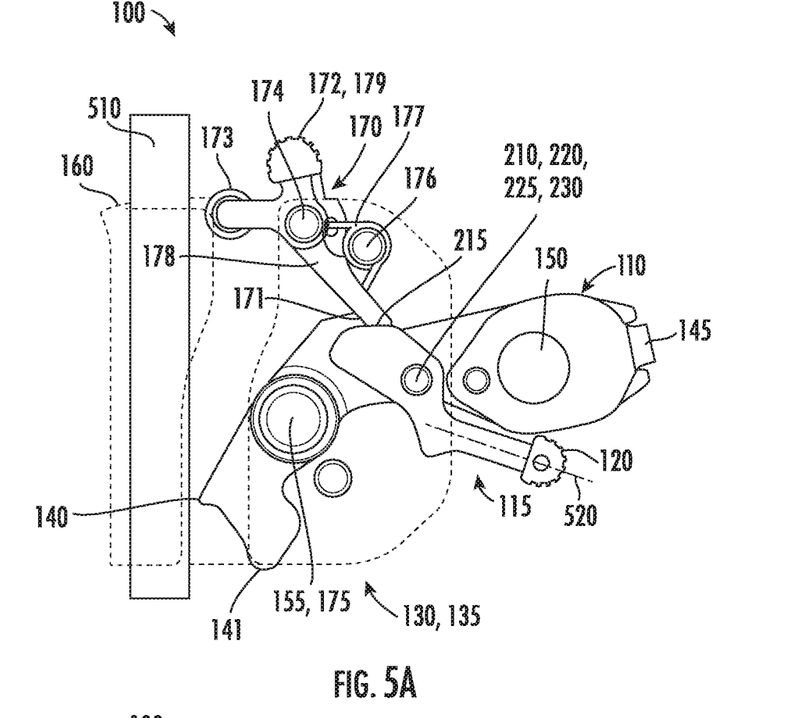
FIG. 5A is a partially transparent view of a locking system in an unlocked position in accordance with an example embodiment of the present disclosure.

Referring now to FIG. 5A, a transparent view of the locking system 100 operatively coupled to housing 130 is shown. In the example shown in FIG. 5A, the braking lever 110 is shown in a position whereby the braking surface 140 is not in contact with a guide member. Moreover, the locking lever 115 is shown in the unlocked position as the locking lever 115 is positioned at a first location that is proximate to the attachment end 145. In the unlocked position, the guide member 510 may freely traverse in both a first direction and a second direction with no engagement with the braking surface 140.

In some embodiments, the locking lever 115 may include an angle of rotation relative to the braking lever 110 defined as the rotation of the locking lever from a first location (e.g., center line 520) to a second location (e.g., center line of 525). In some examples and in an instance in which the locking lever 115 is in the unlocked position, the angle of rotation between the locking lever 115 and the braking lever 110 is less than 10 degrees, in some examples less than 5 degrees, between zero and three degrees and, in further examples, zero degrees.

In some embodiments, the engaging end 215 of the locking lever 115 may be engaged with the engagement member 170. In some embodiments, the engaging end 215 may be engaged with one or more engagement ends 171 of the one or more opening levers 178. In some examples, the engaging end 215 may be tapered to allow for slideable contact between ae engaging end 215 and an engagement end 171 in an instance in which the locking lever 115 rotates around the second center of rotation 235.

In some embodiments, the engagement member 170 may also include an engagement member wheel 173 that is positioned at an end of the engagement member 170 that is opposite to the engagement end 171. In some examples, the opening lever(s) 178 are configured to rotatably engage the guide member 510.

In some embodiments, the engagement member 170 includes one or more opening levers 178 configured to engage with the locking lever 115 such that the locking lever 115 remains in the unlocked position until activated by a user. In some embodiments, the engagement member 170 includes a divider 172 configured to remain fixed during the operation of the one or more opening levers 178. In some embodiments, each opening lever 178 may have an engagement end 171 configured to engage with a locking lever 115 and one or more engagement member springs 177. In some embodiments, the engagement member wheel 173 may be rotatably coupled with one or more of the opening lever(s) 178 at an end opposite of the engagement end 171. In some embodiments, the engagement member spring(s) 177 of an opening lever 178 may be configured to resist the braking lever 110 from rotating such that the braking surface 140 does not disengage from the guide member 510 when the locking lever 115 is in the locked position.

In an example embodiment, the engagement member 170 includes two opening levers 178 on opposing sides of a divider 172 configured to require at least two fingers in order to rotate both opening levers 178. In some embodiments, the engagement member 170 may remain engaged with the locking lever 115 with less than all of the opening levers 178 are opened.

In some embodiments, the one or more opening levers 178 may have an opening lever tab 179 configured to allow the user to rotate the associated opening lever 178. In some embodiments, the opening lever(s) 178 are configured to allow the guide member 510 to be installed or otherwise inserted when in the opening position, such that the braking lever 110 is rotated sufficiently to allow the guide member 510 (e.g., a rope) to be placed in the guide member 160 by moving the braking lever 110 in order to not obstruct the opening between the guide path 160 and the cover plate 135.

Figure 5B:
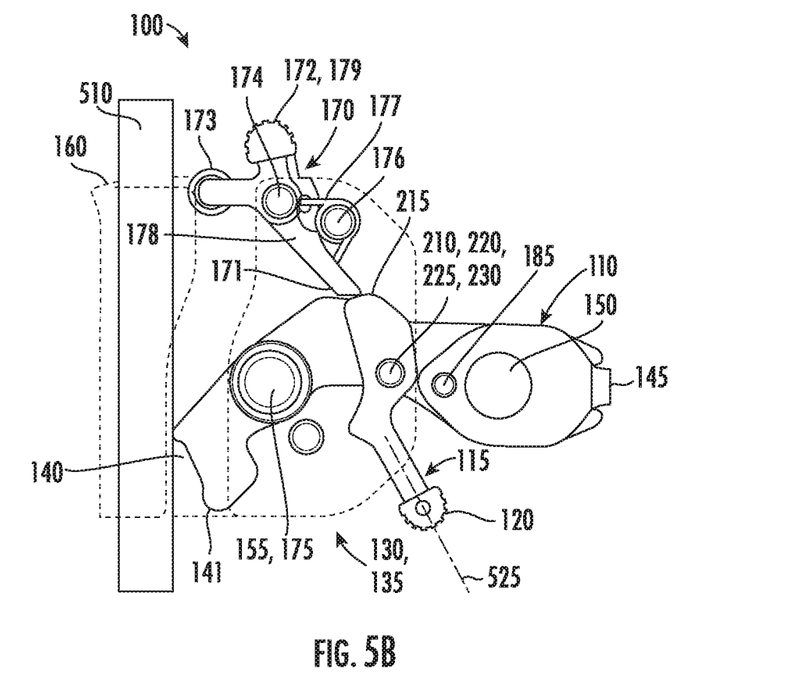
FIG. 5B is a partially transparent view of a locking system in a locked position in accordance with an example embodiment of the present disclosure.

Referring now to FIG. 5B, FIG. 5B illustrates a transparent view of the locking system 100 whereby the braking lever 110 is shown in a position where the braking surface is in contact with a guide member and the locking lever 115 has been moved to the locked position. In some examples and when in a locked position, the locking lever 115 is positioned at a second location distant to the attachment end 145 of the braking lever 110 such that the locking system is locked (e.g., the braking surface 140 is engaged with the guide member 510 such that the guide member can only move in one direction).

In some embodiments, the locking lever 115, when activated by a user that is applying a force in an arcuate direction away from the braking lever, may be moved away from the attachment end 145 of the braking lever 110.

As discussed above in reference to FIGS. 4A, 4B, and 5A, the locking lever 115 may rotate about the second center of rotation 210. In such an example, the engaging end 215 of the locking lever 115 may rotate with the locking lever such that the engaging end slidedly disengages from the engagement end(s) 171 of the engagement member 170. In some embodiments, the engaging end 215 of the locking lever 115 may be tapered such that, as the locking lever rotates, the engaging end of the locking lever slides along the engagement end(s) 171 of the engagement member 170 until a point at which the engaging end 215 disengages from the opening lever(s) 178. In an instance when the locking lever 115 disengages from the opening lever(s), the braking lever 110 and the locking lever 115 freely rotate in the same rotational direction until the braking surface 140 engages with the guide member 510. In some embodiments, the rotation of the braking about the first center of rotation 175 and the rotation of the locking lever 115 about the second center of rotation 235 are in the same plane.

In an example embodiment, after the locking lever 115 is moved to the locked position, the braking lever 110 may be configured with a center of gravity that causes the rotation of the braking surface 140, as a part of the braking lever, into engagement with the guide member 510. After the braking surface 140 engages the guide member 510, the locking system 100 is stopped from traversing the guide member 510 in one direction, while still allowing traversing in the other directions. In an instance where the locking system 100 attempts to move in a first direction (e.g., the opposite direction as the rotation of the braking lever 110), the rotational force of the braking lever provides a force against the guide member such that the braking surface 140 remains engaged with the guide member 510. Alternatively, in an instance where the locking system 100 attempts to move in the other direction (e.g., the same direction as the rotation of the braking lever 110), the force of the guide member 510 is the opposite of the rotational force of the braking lever 110, such that the braking lever disengages, or partially disengages, the guide member 510 to allow the locking system 100 to traverse in that direction.

As is shown in FIG. 5B, as a result of the rotation of the locking lever 115 around the second center of rotation 235, engaging end 215 of the locking lever 115 has engaged with the engagement end 171 of the engagement member 170 so as to prevent braking lever from rotating about first center of rotation 175. As a result, braking lever 110 is forceably held in a position whereby braking surface 140 is contact with the guide member 510. In some examples, when the braking surface 140 is in contact with the guide member 510, movement of the guide member 510 is stopped or otherwise arrested, as is described above. In some embodiments, the braking lever 110 may also include a secondary braking surface 141, such that the secondary braking surface 141 is configured to engage the guide member 510 after the braking surface 140 to provide additional friction to slow down and stop the motion the locking system 100.

In some embodiments, the activation end 120 of the locking lever 115 may have a limited range of motion, such as to allow for one handed activation. For example, the activation end 120 of the locking lever 115 may be configured to rotate between a first location defined as the location of the activation end in the unlocked position proximate to the attachment end 145 of the braking lever 110 (e.g., location of activation end in FIG. 5A) and a second location defined as the location of the activation end 120 in the locked position distant to the attachment end 145 (e.g., location of activation end in FIG. 5B). In some embodiments, the rotational angle may be the angle between the first location and the second location. In some embodiments, the rotational angle may be from zero degrees to 45 degrees. In some embodiments, the rotational angle may be between 10 degrees and 45 degrees. In some embodiments, the rotational angle may be between 20 degrees and 35 degrees. In some embodiments, the rotational angle may be between 25 degrees and 30 degrees. In an example embodiment, the rotational angle may be 30 degrees. In some embodiments, the radial distance from the activation end 120 at the first location to the position of the activation end 120 at the second location may be between 0 and 10 inches. In some embodiments, the distance may be between 2 inches and 8 inches, In some embodiments, the distance may be between 3 inches and 7 inches. In some embodiments, the distance may be between 4 inches and 6 inches. In an example embodiment, the distance may be 5 inches.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A locking system for fall protection, the locking system comprising:
 a housing, wherein the housing defines a guide path through which the housing is slideably attached to a guide member;
 a braking lever having a braking surface and an attachment end, wherein the braking lever is configured to rotate so as to allow a braking surface to engage the guide member; and
 a locking lever that is rotatably coupled to the braking lever,
 wherein in an instance in which the braking surface of the braking lever is disengaged with the guide member, the locking lever is rotatable such that it rotates from an unlocked position to a locked position,
 wherein the braking lever comprises a protrusion that is configured to engage with a locking ball of the locking lever to restrict rotation of the locking lever, and
 wherein in the unlocked position an activation end of the locking lever is positioned in a first location that is proximate to the attachment end and in the locked position the activation end is positioned in a second position distant to the attachment end.

2. The locking system of claim 1, wherein the activation end of the locking lever protrudes outwardly from the housing in both the unlocked position and the locked position.

3. The locking system of claim 1, wherein the locking lever and the braking lever rotate in the same radial direction based on the direction of the locking system.

4. The locking system of claim 1, wherein the locking ball is connected to a locking lever spring, wherein the protrusion movably engages with the locking ball to restrict rotation of the locking lever from the unlocked position to the locked position.

5. The locking system of claim 1, wherein the attachment end of the braking lever comprises an attachment opening configured to attach an attachment mechanism.

6. The locking system of claim 1, wherein the locking system is configured such that in the locking position, the motion of the locking system is restricted in one direction along the guide member.

7. The locking system of claim 1, wherein the arcuate distance between the attachment end of the braking lever and the first location of the activation end of the locking lever is the distance between the average thumb and forefinger.

8. The locking system of claim 1, wherein an angle of rotation of the locking lever relative to the braking lever in the unlocked position to the locked position is from 0 degrees to 30 degrees.

9. The locking system of claim 1, wherein the braking lever is rotatably coupled to the housing at a first point of rotation between the braking surface and the attachment end and the locking lever is rotatably coupled to the braking lever at a second point of rotation between the first point of rotation and the attachment end.

10. The locking system of claim 1, wherein the locking lever and the braking lever are configured to rotate in the same plane of rotation.

11. A locking system for fall protection, the locking system comprising:
 a housing, wherein the housing defines a guide path through which the housing is slideably attached to a guide member;
 a braking lever having a braking surface and an attachment end, wherein the braking lever is operably attached to the housing at a first point of rotation and is configured to rotate so as to allow a braking surface to engage the guide member; and
 a locking lever that is rotatably coupled to the braking lever at a second point of rotation between the first point of rotation and the attachment end,
 wherein the braking lever comprises a protrusion that is configured to engage with a locking ball of the locking lever to restrict rotation of the locking lever, and
 wherein in an instance in which the braking surface of the braking lever is disengaged with the guide member, the locking lever is rotatable such that it rotates from an unlocked position to a locked position.

12. The locking system of claim 11, wherein in the unlocked position an end of the locking lever is positioned in a first location that is proximate to the attachment end and in the locked position is positioned in a second position distant to the attachment end.

13. The locking system of claim 11, wherein an activation end of the locking lever protrudes outwardly from the housing in both the unlocked position and the locked position.

14. The locking system of claim 11, wherein the locking lever and the braking lever rotate in the same direction based on the direction of the locking system.

15. The locking system of claim 11, wherein the locking ball is connected to a locking lever spring, wherein the protrusion movably engages with the locking ball to restrict rotation of the locking lever from the unlocked position to the locked position.

16. The locking system of claim 11, wherein the braking lever is attached to the housing and the locking lever is coupled to the braking lever using rivets.

17. The locking system of claim 11, wherein the attachment end of the braking lever comprises an attachment opening configured to attach an attachment mechanism.

18. The locking system of claim 11, wherein the locking system is configured such that in the locking position, the motion of the locking system is restricted in one direction along the guide member.

19. The locking system of claim 11, wherein the guide member is a rope.

20. The locking system of claim 11, wherein the distance between the attachment end of the braking lever and the first location of the activation end of the locking lever is the distance between the average thumb and forefinger.

21. The locking system of claim 11, an angle of rotation of the locking lever relative to the braking lever in the unlocked position to the locked position is from 0 degrees to 30 degrees.

22. The locking system of claim 11, wherein the locking lever and the braking lever are configured to rotate in the same plane of rotation.

* * * * *